June 13, 1967 — W. R. CALVERT — 3,325,256
AUTOMOBILE EXHAUST GAS CONVERTER
Filed May 20, 1963 — 2 Sheets-Sheet 1
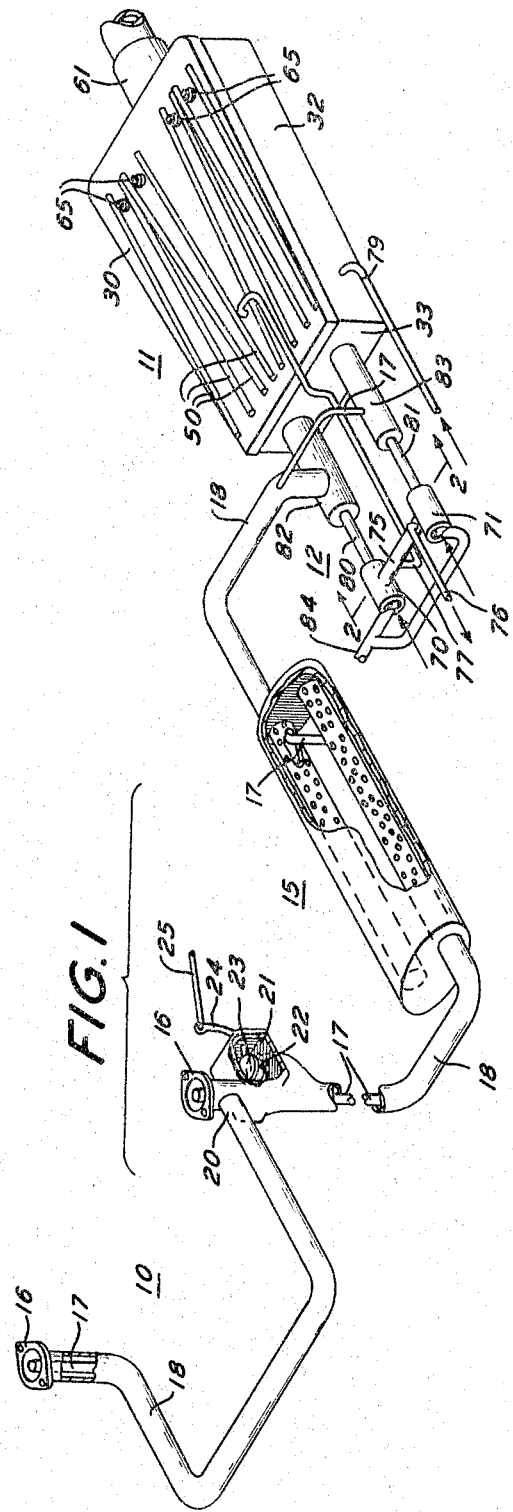
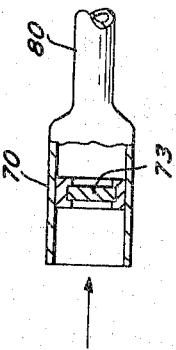
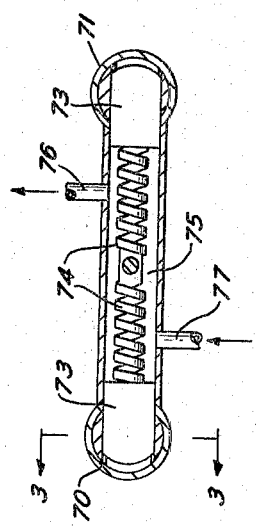
INVENTOR.
WILLARD R. CALVERT
BY
ATTORNEY June 13, 1967 W. R. CALVERT 3,325,256
AUTOMOBILE EXHAUST GAS CONVERTER
Filed May 20, 1963 2 Sheets-Sheet 2
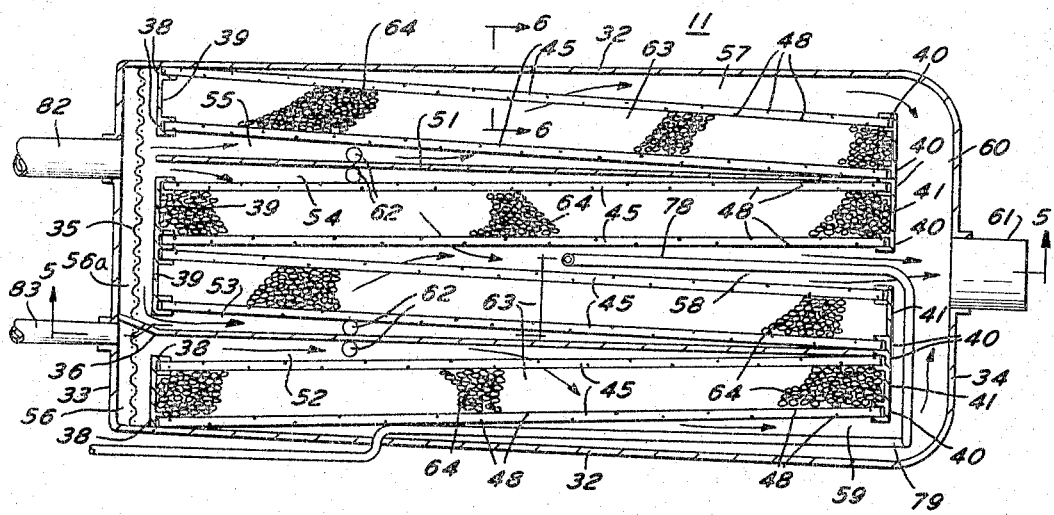
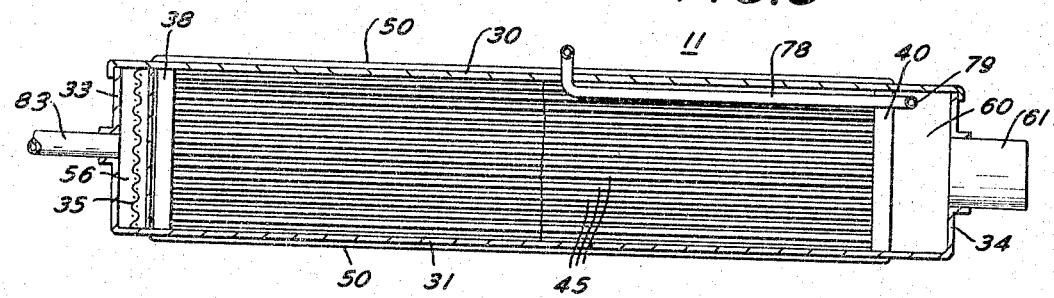
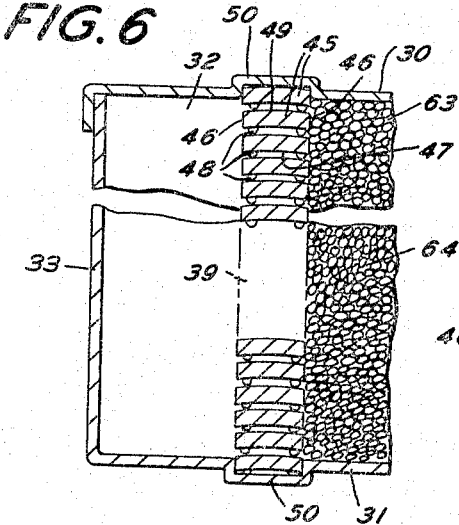
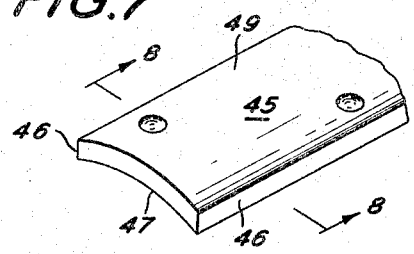
INVENTOR.
WILLARD R. CALVERT
BY
ATTORNEY

United States Patent Office 3,325,256
Patented June 13, 1967

3,325,256
AUTOMOBILE EXHAUST GAS CONVERTER
Willard R. Calvert, Ridley Park, Del.
(809 Teakwood Drive, Severna Park, Md. 21146)
Filed May 20, 1963, Ser. No. 281,685
The portion of the term of the patent subsequent to
Apr. 6, 1982, has been disclaimed
17 Claims. (Cl. 23—288)

This invention relates to a converter for the exhaust gases of internal combustion engines of automobiles and more particularly to improved methods and apparatus for effecting complete conversion of the gases prior to discharge to the atmosphere.

Various systems have heretofore been proposed for the treatment of exhaust gases of automobile engines but these have had various shortcomings and did not accommodate the variations in sensible heat at different operating levels or at different speeds, or for different vehicles.

It is the principal object of the present invention to provide improved methods and apparatus for the conversion of exhaust gases in which the gases are handled in an improved manner from the engine through the final conversion with adjustment of the sensible heat to suitable levels.

It is a further object of the present invention to provide improved methods and apparatus for the catalytic conversion of automobile exhaust gases on the vehicle during use thereof and in which the catalyst is utilized to the best advantage.

It is a further object of the present invention to provide apparatus for the catalytic conversion of automobile exhaust gases which includes a catalytic converter carried by the motor vehicle, of simple construction but with effective catalytic action therein aided by control of the sensible heat of the gases delivered to the converter and by the measured introduction of air for combustion and cooling as determined by the quantity of exhaust gases.

It is a further object of the present invention to provide apparatus for the catalytic conversion of automobile exhaust gases carried by the motor vehicle which includes a catalytic converter connected to the exhaust manifold of the engine with or without a sonic muffler interposed between the manifold and the converter.

It is a further object of the present invention to provide a catalytic converter as aforesaid of improved construction with catalyst walls in a vertical position.

It is a further object of the present invention to provide a catalytic converter of improved construction with simple but effective provisions for the supplying of the exhaust gases and air thereto.

It is a further object of the present invention to provide a catalytic converter having a plurality of sections, which may be of different sizes to accommodate different gas streams.

It is a further object of the present invention to provide a catalytic converter which is constructed and operated so that the heat of reaction is kept below the melting temperature of the lead compounds thereby avoiding the destructive effect of lead compounds and other gasoline additives.

Other objects and advantageous features of the invention will be apparent from the description and claims.

The nature and characteristic features of the invention will be more readily understood from the following description taken in connection with the accompanying drawings forming part thereof, in which;

FIGURE 1 is a view in perspective of catalytic conversion apparatus in accordance with the invention;

FIG. 2 is an enlarged vertical sectional view taken approximately on the line 2—2 of FIG. 1;

FIG. 3 is a vertical sectional view taken approximately on the line 3—3 of FIG. 2;

FIG. 4 is a top plan view of the catalyst housing with part of the top wall broken away to show the interior construction;

FIG. 5 is a vertical sectional view taken approximately on the line 5—5 of FIG. 4;

FIG. 6 is a fragmentary vertical sectional view, enlarged, taken approximately on the line 6—6 of FIG. 4;

FIGURE 7 is an enlarged fragmentary perspective view on one of the wall grids employed in the catalyst housing; and FIG. 8 is a vertical sectional view taken approximately on the line 8—8 of FIG. 7.

It should, of course, be understood that the description and drawings herein are illustrative merely and that various modifications and changes can be made in the structure and methods disclosed without departing from the spirit of the invention.

Like numerals refer to like parts throughout the several views.

Referring now more particularly to the drawings in which the structure is illustrated for purposes of explanation of the invention, an exhaust manifold connection 10 is shown connected as hereinafter explained to a catalyst housing 11. The catalyst housing 11 preferably has an air intake system 12 communicating therewith. If desired, a sonic muffler 15 can be interposed in the exhaust manifold connection 10 between the inlet end thereof and the housing 11.

The exhaust manifold connection 10, which is connected to the internal combustion engine, such as an engine having two exhaust manifolds, is shown as having a pair of flanged intake ends 16, each of which has an inner gas conducting conduit 17 and an outer gas conducting conduit 18. The inner conduits 17 are connected in communicating relation and the outer conduits 18 are connected in communicating relation as at 20.

The conduit 18 beyond the interconnection 20 is connected to a flow control chamber 21. The chamber 21 has a delivery port 22, connected to the conduit 18 therebeyond, controlled by the positioning with respect thereto of a valve plate 23. The valve plate 23 is carried on a positioning arm 24. The arm 24 has a control rod 25 pivotally connected thereto. The control rod 25 is connected to any desired device such as the throttle control arm of the carburetor or to a vacuum activated diaphragm mechanism on the intake manifold which moves the arm 24 to open position when the intake manifold vacuum decreases to a predetermined amount, for example 16 inches of mercury, and to closed position when the intake vacuum increases to a different predetermined amount, for example 17 inches of mercury.

The sonic muffler 15 if used, is of any desired type including the perforated wall type for damping the sonic pulsations but is preferably constructed so that the inner conduit 17 passes directly therethrough without any delivery of gases therefrom while the gases in the outer conduit 18 are subjected to the sonic damping and are retained in heat interchange relation for purposes to be explained.

The outer conduit 18, with the inner conduit 17 therein and coaxial therewith, are separated at the air intake system 12 for controlled admixture of air with the gases prior to their delivery into the catalyst housing 11.

The catalyst housing 11 can be of any preferred shape including the shape in transverse cross section. In a specific embodiment, the housing 11 has top and bottom walls 30 and 31, opposite side walls 32, an inlet end wall 33 and an outlet end wall 34. Spaced inwardly from the inlet end wall 33 and between the top and bottom walls 30 and 31 and the side walls 32 a screen 35 is provided to trap flake like lead deposits, rust, scale or other solids.

Extending from the wall 33, an interior divider wall 36 is provided which extends from the top wall 30 to the bottom wall 31, parallel to the side walls 32 and spaced from one side wall 32 at a distance of about one quarter of the transverse distance between the side walls 32. The divider wall 36 is terminated in spaced relation to the outlet end wall 34 to divide the interior into a minor path for small quantities of gas from the inner gas conduit 17 and a major path for larger quantities of gas from the outer gas conduit 18 simultaneously with utilization of the inner gas conduit 17.

End channels 38 vertically disposed in spaced pairs are provided inwardly of the inlet end wall 33 and are held at fixed locations in any desired manner such as by being permanently secured to the bottom wall 31 and with spacer plates 39 therebetween. End channels 40, vertically disposed in spaced pairs are provided inwardly of the outlet end wall 34, have spacer plates 41 and are held at fixed locations in the same manner as the channels 38.

The components of the catalyst housing 11 can be of sheet metal, if desired.

Each facing pair of channels 38 and 40 preferably has extending therebetween laminated wall grids 45 in vertical stacks, shown in more detail in FIGS. 6, 7 and 8. The lengths of the wall grids 45 are preferably such as to permit expansion and contraction with changes of temperature. The wall grids 45 are each preferably metallic and of arcuate shape between their side edges 46 and their lower faces 47 have spaced projections 48 extending therefrom for engagement with the upper face 49 of the next grid 45 therebelow. The top wall 30 and bottom wall 31 preferably have elongated grooves or channels 50 which stiffen these walls and aid in the assembly of the grids and the housing 11.

A divider wall 51 is preferably provided extending from the plane of the spacer plates 39 to the plane of the spacer plates 41.

It will be noted that the pairs of channels 38 and 40 are positioned so that the wall grids 45 in pairs converge towards the outlet end wall 34.

The divider wall 36 and the divider wall 51, with the contiguous wall grid 45 provide inlet passageways 52, 53, 54 and 55. The inlet passageway 52 is in communication through the screen 35 with an inlet chamber 56, and the passageways 53, 54 and 55 are in communication with an inlet chamber 56a.

The wall grids 45 also provide outlet passageways 57, 58 and 59 which are in communication with an outlet chamber 60. A discharge pipe 61 extending through the outlet end wall 34 communicates with the outlet chamber 60. The discharge pipe 61 is preferably of an area at least four times the total areas of the gas and air inlets in the wall 33. The bottom wall 31, at each of the inlet passageways 52, 53, 54 and 55 is preferably provided with fusible plugs 62 to provide gas discharge if excessive inlet temperatures occur.

Within the channels or chambers 63 between pairs of parallel wall grids 45, a filling of catalytic material 64 is provided. The top wall 30 can be provided with filling plugs 65 threaded into to permit the insertion and removal of catalytic material 64 therethrough.

While any desired catalyst may be employed for the catalytic material 64, it is preferred to employ small pellets, as hereinafter more specifically referred to, of alumina which has 75 to 300 square meters nitrogen adsorptive surface per gram, impregnated with copper and chromium and as described in detail in U.S. Patent No. 3,053,773.

The air intake system 12 preferably includes air inlet pipes 70 and 71 having slidable valve plates 73 therein positioned by temperature responsive elements 74, such as bimetallic spirals, mounted in a chamber 75. The chamber 75 has a water return tube 76 and an inlet pipe 77 connected thereto. The pipe 77 extends to the catalyst housing 11 and has an interiorly disposed portion 78 which extends in the passageway 58, the chamber 60 and the passageway 59, for sensing the temperature at these locations and utilizing this for controlling the air intake for conversion in the housing 11. The portion 79 of the pipe 77 leads from any suitable source of water (not shown) such as the automobile radiator, and the tube 76 returns thereto.

The air inlet pipes 70 and 71 are connected respectively by pipes 80 and 81 to venturis 82 and 83 to which the outer conduit 18 and inner conduit 17 are respectively connected for inducing air past the valve plates 73.

A blow by gas supply connection 84 from the crankcase (not shown) of the automobile engine, preferably extends to the entrance of either or both of the air inlet pipes 70 and 71.

In the removal of carbon monoxide and hydrocarbons from the exhaust the problem is complicated because of the variable nature of the exhaust products and the effects of tetra-ethyl lead and other additives.

The exhaust gas mass is proportionate to the gasoline and oil consumption of the particular engine, and is a constant for any given fuel at stoichiometric mixture with air as a source of oxygen.

The exhaust gas has a heat content comprised of the sensible heat of the gas mass and the potential heat from the expected conversion of the combustibles remaining in the exhaust gas from the engine. As a result of engine operation some of the heat content of the fuel has been converted to useful work, some has been absorbed by the cooling system of the engine and some of the heat has heretofore been lost through the bare walls of the exhaust conduits from the engine even if a catalytic converter of some type was employed. This loss is great when the car is in motion, and when ambient air is moving rapidly over the bare walls.

At cold start heat is also absorbed by other masses such as the cold engine, conduit metal, cold water in the cooling system, cold catalyst in the converter, and in other ways. The water formed as one of the products of combustion, if it condenses, must be revaporized from the conduits and from the catalyst.

In order to effect catalytic conversion it is necessary to attain and maintain a minimum operating temperature level which in the operation of the apparatus herein described can start after the catalyst is dry and elevated to a temperature of about 450° F.

Assume that exhaust gas is delivered from the engine to the exhaust manifold connection 11.

The exhaust mass flow is low at idling speeds and high at maximum work load and full wide open throttle. It can be expressed as gasoline consumed, say in grams per minute. Automobile engines operate in a consumption range between about 10 and 600 grams per minute, dependent upon carburetion, ignition, work load, piston displacement and other factors. Any given automobile can be characterized by determining the total fuel consumption at maximum work load with wide open throttle, with the engine running against a load so great that one more small increment of opposing force will stall the engine.

The catalyst activity herein of the catalytic material 64 is at a low value to avoid the destructive effects of lead compounds and other additives. A stable level is reached, after a large amount of gasoline with tetra-ethyl lead additives has been consumed, with the heat of reaction kept below that maximum heat content which can melt the lead and fuse it with the catalyst metals. The catalyst activity for complete conversion can be expressed as the area facing the exhaust stream required per gram per minute of fuel consumed. The values for this will vary dependent upon a number of factors.

At sensible heat content of gases entering the catalyst in the channels 63 and contacting the catalytic material 64 corresponding to levels of 650° C. to 850° C. which occurs when gasoline consumption is between about 10 to 70 grams per minute, the face area of catalyst needed for complete conversion is at least 50 square inches but not more than about 200 square inches. At sensible heat of 850° F. to 1050° F. the face area could be small, or about 0.5 to 2.0 square inches per gram of fuel per minute because the reaction rate is very much faster.

Thus, a catalytic process for a high powered automobile would include a face area of 300 to 1200 square inches for a maximum load rate of 600 grams per minute.

At lower fuel rates of 10 to 70 grams per minute the sensible heat may fall to lower levels in conventional sonic muffler systems and with a car moving at high speed with systems heretofore available may fall below the necessary temperature of 650° F. (note Eastwood, U.S. Patent No. 3,050,935). The apparatus of the present invention and the methods as herein disclosed provide for maintaining the temperature of the exhaust gases at the desired temperature levels.

It is known that the catalyst bed depth or wall thickness is determined by pellet size and that if the pellets are smaller a lesser depth is necessary. The volume, mass, and total geometric surface of a given catalyst are determined by the face area and depth. Selection of a sphere diameter also has an effect on the catalyst activity since the lead contaminant and fusion depends upon the total surface involved and the total heat involved, i.e., B.t.u. per square inch geometrical surface. For example, .040 inch diameter spheres at 40% voids provide 91 square inches geometric surface per cubic inch of spheres in the catalyst bed. Since a 500 square inch face area bed at 1.25 inches bed depth has 625 cubic inches volume, then it will present 57,000 square inches to the gas stream passing through it.

The potential heat to be released by the conversion of the waste fuel in the exhaust gas is an unknown in any system which provides the gases. When the operating conditions are determined the potential heat to be released may be ascertained. Since it is impossible to predescribe normal as well as malfunctional operation a control variable is incorporated into the process and apparatus of the present invention to adjust the potential heat to a suitable level for operation.

The suitable level of operation is dependent upon sensible heat level and upon the effects of ambient air on heat exchange from bare walls and resulting from dilution for stoichiometric oxygen and for cooling to adjust sensible heat downward to permit a reasonable potential heat and yet keep it below the lead dust fusion limit.

The beds of catalytic material 64 in the channels 63 provide loosely packed catalyst with a very high bed face area per unit of volume of the housing 11 with laminated retaining wall grids 45 of metal thick enough to resist warping at high temperature operating levels. The top and bottom walls 30 and 31 can be made of metal of a thickness to add strength, avoid sonic vibration problems and minimize thermal expansion joint problems. The catalyst beds in a specific embodiment for the gases from the inner gas conduit 17 have an entrance face area between 50 and 200 square inches, and preferably about 100 square inches, with an exit face area equal or larger. The entrance faces from each of the other passageways for the outer gas conduit 18 as shown are the same size. A total amounting to 0.5 to 2.0 square inches per gram per minute of gasoline consumed at maximum work load and full open throttle provides a satisfactory measure of size, 1.0 square inch per gram per minute being preferred. The catalyst, such as a combination of copper oxide and chromium oxide on a formed sphere or pellet of alumina as a support is preferred with the sphere or pellet dimensions such that the geometric surface presented to the stream of gases, with catalyst wall face area as above, will be between 50 and 150 square inches per gram per minute of gasoline consumed, and preferably about 110 square inches. The catalyst beds herein are of adequate face area and depth so that there is a low pressure drop across the bed in the channels 63 thus permitting inspiration by the gas passing through the venturis 82 and 83 of air for admixture with the exhaust gas.

The catalyst beds herein also permit dust discharge without blocking by the catalyst spheres. Movement of the catalyst is also permitted so that a self cleaning action with respect to the dust can occur. The laminated grid structure expands and contracts with temperature changes and this provides a self-cleaning movement at the gas passage slots.

The venturis 82 and 83 for inspirating air for the conversion should be of suitable sizes to accommodate the necessary dilution up to about four times and the volume expansion across the catalyst bed of about three to four times resulting from gas temperature rise and the relative demands of the minor and major gas flows thereinto.

The sonic effects can be minimized by the inclusion in the system of the sonic muffler 15 before the gases reach the venturis 82 and 83 and no choking off is required to obtain the sonic effects. At the same time, for high gas flow heat exchange or heat loss can occur.

In operation at low levels, say with gasoline consumption rates between about 10 to 70 grams per minute the valve plate 23 closes the valve port 22. With low flow the gas flow is through the inner gas conduit 17 so that less heat is lost because of the insulating action of the space between the inner conduit 17 and the outer conduit 18 and therefore available for attaining the desired operating temperatures for catalytic conversion.

For higher flow rates where there is excess sensible heat, the exposure of a portion of the exhaust gases to a bare wall conduit, the outer gas conduit 18, sensible heat can be lost as desired so that the catalytic reaction temperature is maintained below a maximum level imposed by the presence of the lead contaminant or the catalyst.

The arrangement of passageways and the divider wall 36 permits of retaining the separation of a smaller flow of gas for low level operation but with capacity for high flow operation when required.

It will be noted that a high flow rate of gas through the small chamber and passageway would raise the pressure and velocity. High pressure would be detrimental to the operation of the internal combustion engine and to the operation of the venturi air-aspirator making both operate improperly. High velocity would cause any catalytic reaction to cease even though gas temperature is as great as 1200 F. However, if the low flow was through the large chamber and passageway the heat carried by the gas would be extremely slow in evaporating moisture and other materials adsorbed on the catalyst therein and in heating the mass of metal and catalyst, so that conversion would not occur when the automobile and engine are operated and used for a shorter time than that required for this slow heating.

I claim:

1. An automobile exhaust gas conversion system comprising an exhaust gas manifold connection having an inner gas conduit, an outer gas conduit in surrounding relation to said inner gas conduit, a catalyst housing, air inlet connections to each of which one of said conduits extends, said connections extending to said catalyst housing for the delivery of exhaust gas and air to said housing, and a plurality of beds of catalyst in the interior of said catalyst housing for contact of the exhaust gas and air from said conduits.

2. A conversion system as defined in claim 1 in which a sonic muffler is interposed between said manifold connection and said air inlet connection.

3. A conversion system as defined in claim 1 in which one of said gas conduits has a larger gas capacity and a sonic muffler is interposed in said gas conduit.

4. A conversion system as defined in claim 1 in which said catalyst housing has the interior thereof divided into a plurality of passageways each communicating with a bed of catalyst and one of said conduits is connected for delivery of exhaust gas therefrom to one of said passageways and the other of said gas conduits is connected for delivery of exhaust gas therefrom to another of said passageways.

5. A conversion system as defined in claim 1 in which at least one of said air inlet connections has a valve therein for controlling air flow therethrough.

6. A conversion system as defined in claim 1 in which at least one of said air inlet connections has a valve therein for controlling air flow therethrough, and a member is provided responsive to temperature conditions in said catalyst housing for controlling the positioning of said valve.

7. A conversion system as defined in claim 1 in which both of said air inlet connections have valves therein for controlling air flow therethrough and members are provided responsive to temperature conditions in said catalyst housing for controlling the positioning of said valves.

8. A conversion system as defined in claim 1 in which said air inlet connections have air supply members connected thereto for positive admixture of air with exhaust gas delivered thereto.

9. A conversion system as defined in claim 1 in which said air inlet connections have venturis therein for inspiration of air by flow of exhaust gas therethrough.

10. A conversion system as defined in claim 1 in which a member is provided for controlling the distribution of flow between said conduits.

11. A conversion system as defined in claim 1 in which said outer conduit has a flow control valve therein and a control member is provided responsive to a condition of the automabile engine for controlling said valve.

12. A conversion system as defined in claim 1 in which said beds of catalyst are retained in position by spaced perforate vertical walls.

13. A conversion system as defined in claim 1 in which said beds of catalyst are retained in position by spaced vertically disposed stacks of spaced elongated plates.

14. A conversion device for automobile exhaust gases comprising a housing having spaced top and bottom walls, opposite side walls connecting said top and bottom walls, inlet and outlet end walls at opposite ends of said housing, a plurality of spaced pairs of perforate vertical walls providing channels therebetween, catalytic material in particular shape in said channels, said housing having an inlet chamber contiguous to said inlet end wall, and a vertical divider wall in the interior of said housing closer to one side wall than to the other and extending into said chamber and separating the interior into a plurality of passageways for different gas mass flow therein, and exhaust gas and air inlets communicating with the interior of said housing on opposite sides of said divider wall.

15. A conversion device as defined in claim 14 in which said housing has an exhaust connection with an area at least three times the combined areas of said inlets.

16. A conversion device as defined in claim 14 in which said vertical walls comprise vertically stacked spaced plates.

17. A conversion device as defined in claim 14 in which said vertical walls comprise vertically stacked arcuate plates with spacers therebetween.

References Cited

UNITED STATES PATENTS

| | | | |
|---|---|---|---|
| 2,086,839 | 4/1963 | Bloch | 23—2 |
| 3,176,461 | 5/1965 | Calvert | 23—288 X |

OSCAR R. VERTIZ, *Primary Examiner.*

EARL C. THOMAS, *Examiner.*